United States Patent
Wade et al.

(10) Patent No.: US 10,409,755 B2
(45) Date of Patent: Sep. 10, 2019

(54) MULTI-MODE USB INTERFACE

(71) Applicant: Square, Inc., San Francisco, CA (US)

(72) Inventors: Jeremy Wade, San Francisco, CA (US); Joseph Laucks, Berkeley, CA (US)

(73) Assignee: Square, Inc., San Francisco, CA (US)

( * ) Notice: Subject to any disclaimer, the term of this patent is extended or adjusted under 35 U.S.C. 154(b) by 495 days.

(21) Appl. No.: 15/197,729

(22) Filed: Jun. 29, 2016

(65) Prior Publication Data

US 2018/0005207 A1 Jan. 4, 2018

(51) Int. Cl.
| | | |
|---|---|---|
| G06F 13/40 | (2006.01) | |
| G06F 1/26 | (2006.01) | |
| G06F 13/42 | (2006.01) | |
| G07G 1/00 | (2006.01) | |
| G07G 1/12 | (2006.01) | |
| G06Q 20/20 | (2012.01) | |
| G06Q 20/32 | (2012.01) | |

(52) U.S. Cl.
CPC ............ *G06F 13/4068* (2013.01); *G06F 1/26* (2013.01); *G06F 13/4282* (2013.01); *G06Q 20/204* (2013.01); *G06Q 20/3223* (2013.01); *G07G 1/0018* (2013.01); *G07G 1/12* (2013.01)

(58) Field of Classification Search
CPC .. G06F 13/00; G06F 3/00; G06F 1/00; H02M 7/02; H02M 7/155; H02J 7/00
USPC ...... 710/316; 363/74, 89; 320/107, 115, 153
See application file for complete search history.

(56) References Cited

U.S. PATENT DOCUMENTS

| | | | |
|---|---|---|---|
| 5,784,581 A | 7/1998 | Hannah | |
| 7,108,560 B1 | 9/2006 | Chou et al. | |
| 9,710,037 B1* | 7/2017 | Wade | G06F 1/266 |
| 2005/0189908 A1* | 9/2005 | Guthrie | G06F 1/263 |
| | | | 320/107 |
| 2008/0059661 A1 | 3/2008 | Akahane | |
| 2008/0162974 A1 | 7/2008 | Keys | |
| 2008/0265838 A1* | 10/2008 | Garg | G06F 1/266 |
| | | | 320/115 |
| 2008/0316779 A1* | 12/2008 | Jayaraman | H02M 1/4225 |
| | | | 363/74 |
| 2010/0169534 A1* | 7/2010 | Saarinen | G06F 1/266 |
| | | | 710/316 |

FOREIGN PATENT DOCUMENTS

| | | |
|---|---|---|
| EP | 2 498 167 A1 | 9/2012 |
| WO | 2015/089803 A1 | 6/2015 |
| WO | 2018/005455 A1 | 1/2018 |

OTHER PUBLICATIONS

Notice of Allowance dated Mar. 20, 2017, for U.S. Appl. No. 15/197,723, of Wade, J., et al., filed Jun. 29, 2016.

(Continued)

*Primary Examiner* — Olusegun Goyea
(74) *Attorney, Agent, or Firm* — Maynard Cooper & Gale, LLP; Chitra M. Kalyanaraman, Esq.

(57) ABSTRACT

A merchant device has a USB interface that includes an ID pin and a voltage pin. When the merchant device receives an oscillating signal at the ID pin, it connects the voltage pin to a power supply of the merchant device. The merchant device also includes a download switch coupled to the ID pin. When it is desired to reprogram a device connected by the USB interface, the download switch provides a programming voltage to the ID pin.

30 Claims, 10 Drawing Sheets

(56) References Cited

OTHER PUBLICATIONS

Non-Final Office Action dated Nov. 9, 2016, for U.S. Appl. No. 15/197,723, of Wade, J., et al., filed Jun. 29, 2016.
International Search Report and Written Opinion for International Application No. PCT/US2017/039447, dated Sep. 21, 2017.
Ex Parte Quayle Action mailed Mar. 22, 2019, for U.S. Appl. No. 15/197,717, of Maibach, M.H., et al. filed Jun. 29, 2016.

* cited by examiner

MULTI-MODE USB INTERFACE

BACKGROUND

Electronic devices require a power source to power circuitry such as discrete circuits, processors, communication interfaces, user interfaces, some memory, and various other components. Power may often be supplied from a variety of sources, such as directly from an AC mains power source or from a DC power source such as a battery or AC-to-DC convertor. Often, a variety of electronic devices may be located in close proximity to each other, may communicate with each other, and may perform related functionality. For example, a television set may be located in proximity and be connected to a number of devices such cable boxes, speakers, game consoles, streaming media players, and DVD players. Many of these devices may require their own power source, and connections between devices may be accomplished by numerous cables. The resulting overall setup may be complicated, energy inefficient, and visually unappealing.

Businesses have cash registers and similar systems to handle payment transactions with customers. Such systems often have numerous components, such as screens for entering orders, cash drawers, receipt printers, credit card machines, keyboards, and various other items. Each of these components may require a power source, and communications between components may be performed over a number of wired connections. The resulting system may thus take up a large amount of space and may be complicated to set up, move, use, and troubleshoot.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A point-of-sale system comprises a USB hub, a merchant terminal, and a customer terminal. The USB hub is connected to a power supply, and has multiple USB interfaces to allow USB devices such as cash drawers and receipt printers to be attached to the USB hub. The merchant terminal also connects to the USB hub through a USB cable and USB interfaces of the merchant terminal and USB hub. The merchant terminal receives its power through this USB connection, and is able to communicate with other USB devices through the USB hub. The customer terminal connects to the merchant terminal through a second USB connection of the merchant terminal. Power is provided to the customer terminal through this second USB connection, and the merchant terminal and customer terminal also communicate through this connection.

The power supply voltage that is provided to the customer terminal from the merchant terminal may be different than a standard USB supply voltage. When the customer terminal is initially connected to the merchant terminal, only the standard USB supply voltage may be provided to the customer terminal. In response to receiving the standard supply voltage, the customer terminal sends an oscillating signal to the merchant terminal over an ID line of the USB cable. When the merchant terminal receives the oscillating signal, it switches to providing the power supply voltage to the customer terminal.

The merchant terminal may also include a download switch that allows the merchant terminal to provide a programming voltage to the customer terminal. When it is desired to reprogram the customer terminal, the programming may be sent to the customer terminal over the ID line of the USB cable. The customer terminal may then enter a programming mode. The merchant terminal may provide a download to the customer terminal through the data lines of the USB cable.

Figure 1:
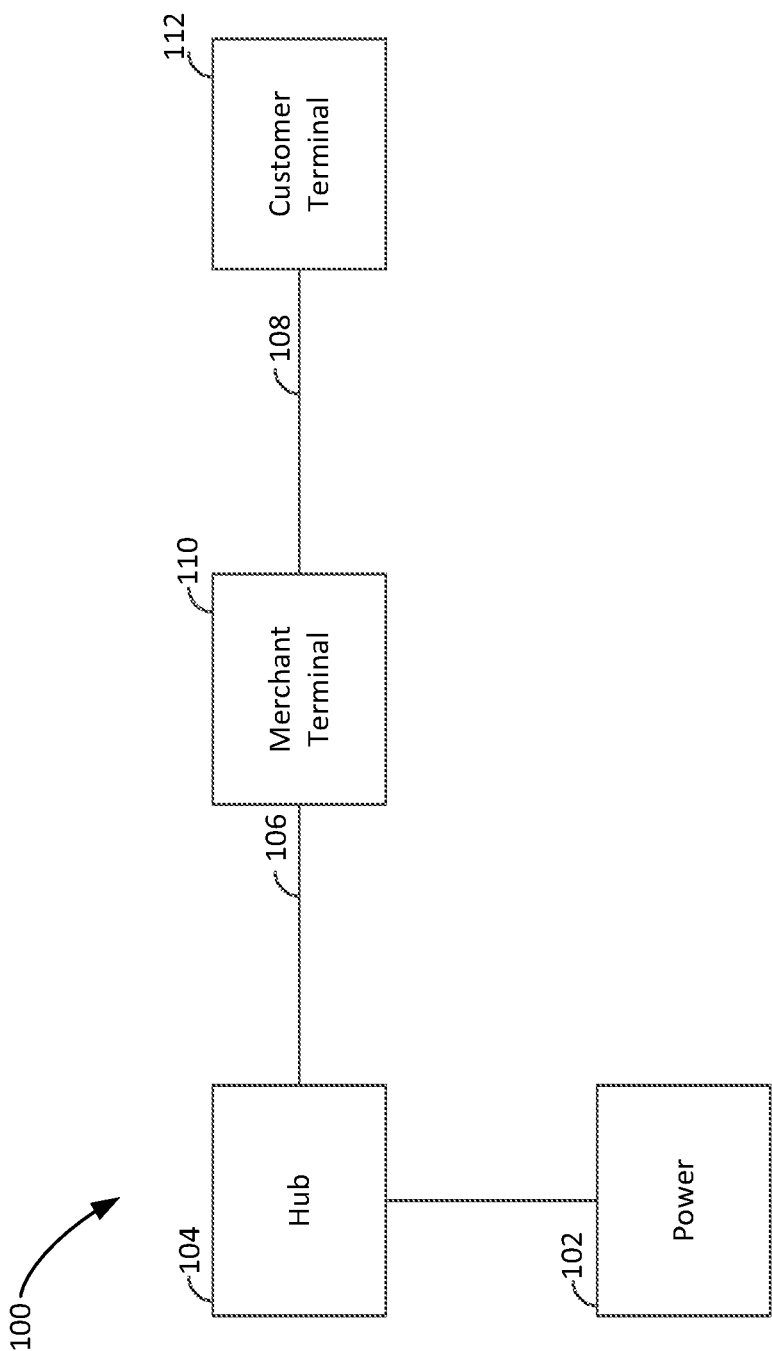
FIG. 1 shows an illustrative block diagram a power supply, USB hub, merchant terminal and customer terminal of a point-of-sale system in accordance with some embodiments of the present disclosure.

FIG. 1 depicts an illustrative block diagram of a point-of-sale system 100 in accordance with some embodiments of the present disclosure. In one embodiment, point-of-sale system 100 includes a power supply 102, USB hub 104, USB connector 106, USB connector 108, merchant terminal 110, and customer terminal 112. These components of point-of-sale system 100 facilitate electronic payment transactions between a merchant and a customer.

In an embodiment, the power supply 102 may connect to an AC power source and convert the AC voltage into a DC voltage for use by the components of the point-of-sale system 100. A DC voltage (e.g., 12 volts) may be provided to the USB hub 104. USB hub 104 may convert the received DC voltage into a plurality of DC voltages for use in powering circuitry of the USB hub 104. The USB hub 104 allow for the merchant terminal 110 to communicate with a plurality of other USB peripherals, such as a receipt printer, cash drawer, barcode scanner, scale, keyboard, USB-ethernet dongle/USB mifi, and other similar peripheral devices. As described herein, the USB hub 104 may also include power supply circuitry that selectively allows the USB hub to prove a 12 volt power supply signal to merchant terminal 110 via USB connector 106, and via power supply circuitry of merchant terminal 110 and USB connector 108, to customer terminal 112.

The electronic interactions between the merchant and the customer may take place between the merchant terminal 110 and the customer terminal 112. In one embodiment, the merchant terminal supports an interactive computing device that is capable of processing payment information (e.g., encrypted payment card data and user authentication data) and transaction information (e.g., purchase amount and point-of-purchase information) with the customer terminal 112 and a remote payment server (not depicted). The merchant terminal 110 may include a plurality of interfaces as described herein in order to receive and provide power, to communicate with the customer terminal 112 and other devices such a remote payment server, and to physically interface with other components such as the customer terminal 112. The interactive computing device of the merchant terminal 110 may execute software instructions of a point-of-sale application to manage user interactions with a merchant, communications with the customer terminal 112, and communications with remote payment servers. The merchant is provided an interface through which it can enter selections of purchased items, access customer information (e.g., loyalty information), check inventory, calculate taxes and fees, and otherwise perform necessary customer service and transaction steps.

The customer terminal 112 may provide a variety of interfaces to interact with the merchant terminal 110 and a customer. A user interface of the customer terminal may allow the user to interact with the customer terminal in order to interact with the merchant (e.g., select items for purchase, answer queries, confirm purchases, provide PINS and signatures, etc.), receive payment information (e.g., from a swipe card, chip card, or NFC-enabled device) from a customer, communicate with the merchant terminal 110 (e.g., via USB connector 108), receive power from merchant terminal 110 (e.g., via USB connector 108), and physically attach to the merchant terminal 110 (e.g., via connecting enclosures of each of the customer terminal 112 and the merchant terminal).

Figure 2:
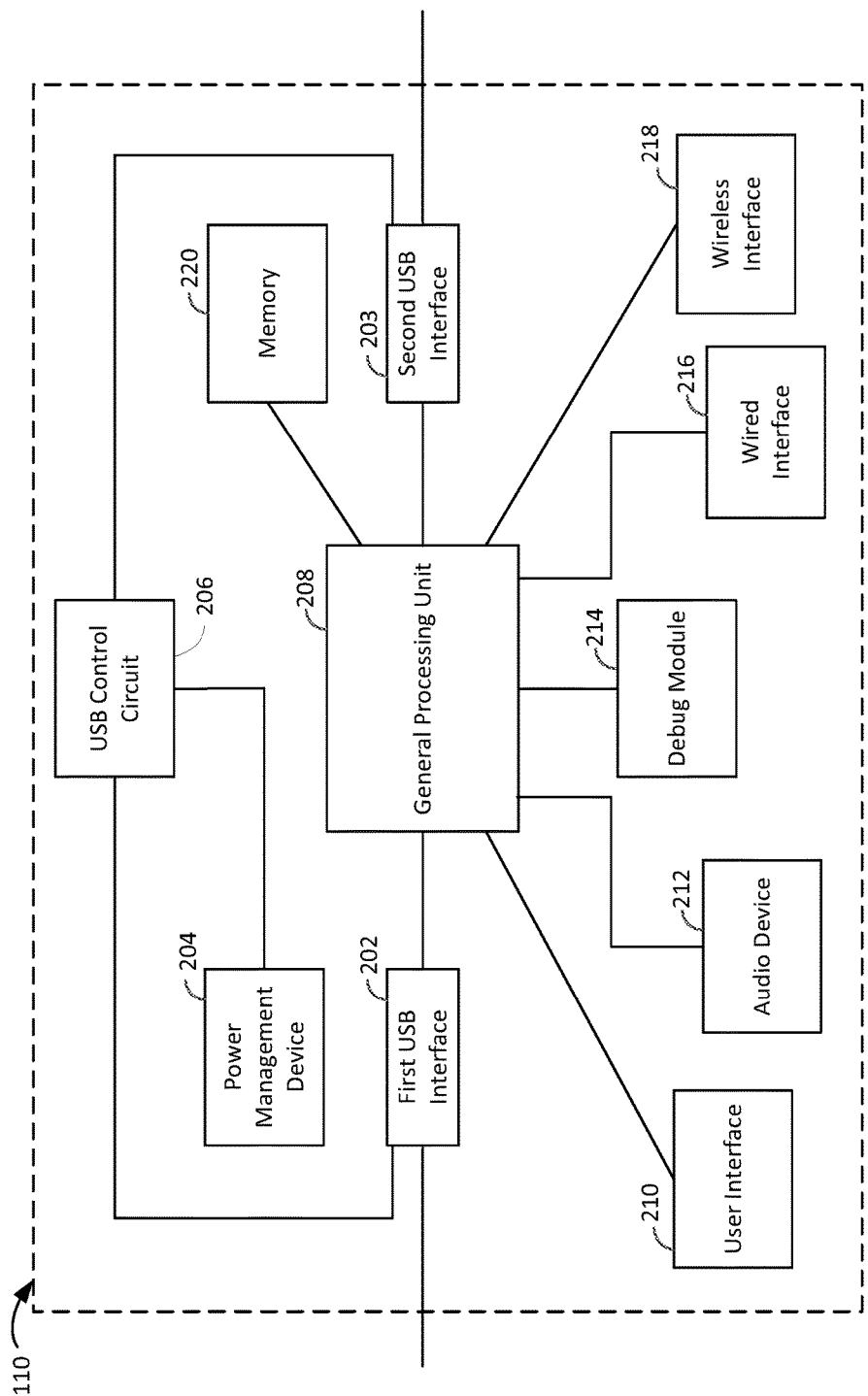
FIG. 2 depicts an illustrative block diagram of components of the merchant terminal in accordance with some embodiments of the present disclosure.

FIG. 2 depicts a block diagram of an example merchant terminal 110 in accordance with some embodiments of the present disclosure. Although particular components are depicted in a particular arrangement in FIG. 2, it will be understood that merchant terminal 110 may include additional components, one or more of the components depicted in FIG. 2 may not be included in merchant terminal 110, and the components of merchant terminal 110 may be rearranged in any suitable manner. Although it will be understood that merchant terminal 110 of point-of-sale system 100 may be implemented in any suitable manner, in one embodiment the merchant terminal 110 may comprise a first USB interface 202, a second USB interface 203, a power management device 204, a USB control circuit 206, a processing unit 208, a user interface 210, an audio device 212, a debug module 214, a wired interface 216, a wireless interface 218, and a memory 220.

Processing unit 208 of merchant terminal 110 may include a processor capable of performing the processing functions of the merchant terminal 110 as described herein, and may be embodied by any suitable hardware, software, memory, and circuitry as is necessary to perform those functions. Processing unit 208 may include any suitable number of processors, and may perform the operations of merchant terminal 110 based on instructions in any suitable number of memories and memory types. In an example embodiment, the processing unit 208 may be a System-on-Chip (SoC) processor having a dual-core processor (e.g., a Dual core ARM Cortex A7/A9).

Processing unit 208 may execute instructions stored in memory 220 of merchant terminal 110 to control the operations and processing of merchant terminal 110, and memory may also store information necessary for the operation of merchant terminal 110. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device. In an example embodiment, memory 220 may include a flash memory and a RAM memory (e.g., a 16 GB eMMC NAND flash and a 2 GB LPDDR3 RAM).

First USB interface 202 and second USB interface 203 may provide for connection of other devices or components to the merchant terminal 110 as appropriate. Although any type of USB connector and interface may be used in accordance with the present disclosure, in an embodiment each of first USB interface 202 and second USB interface 203 may be a USB type B receptacle for interfacing with a type B connector of a USB connector (e.g., USB connector 106 or 108, for connecting to USB hub 104 or customer terminal 112). As will be described herein, in an embodiment first USB interface 202 and second USB interface 203 may be interchangeable, such that merchant terminal 110 may function in an identical manner regardless of which of the USB interfaces is coupled to USB hub 104 or customer terminal 112. In some embodiments (not depicted in FIG. 2), merchant terminal may include additional interfaces, such additional USB ports, Lightning, Firewire, Ethernet, etc.

Although power may be provided to merchant terminal 110 in any suitable manner, in an embodiment DC power may be provided from USB hub 104 when it is connected to the merchant terminal via first USB interface 202 or second USB interface 203. A USB control circuit 206 may include circuitry for interacting with the USB hub 104 to receive the incoming DC power signal and to distribute that signal to other components of the merchant terminal 110 (e.g., via power management device 204) and to the customer terminal 112 (e.g., via the other USB interface of first USB interface 202 and second USB interface 203). A power management device 204 (e.g., a discrete power management integrated circuit) may receive power provided from USB hub 104 through one of the USB interfaces (first USB interface 202 or second USB interface 203) and USB control circuit 206, and may perform functions related to power requirements of a host system (e.g., DC to DC conversion, battery charging, linear regulation, power sequencing and other miscellaneous system power functions).

Merchant terminal 110 may also include a user interface 210. User interface 210 may provide various interfaces and outputs to the merchant terminal 110 to be viewed by a merchant. An example user interface 210 may include hardware and software for interacting with a user, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant terminal 110.

Merchant terminal 110 may also include an audio device 212. Audio device 212 may provide audio for the merchant terminal 110. An example audio device 210 may comprise an audio amplifier and a speaker for providing appropriate audio for the merchant terminal 110.

Merchant terminal 110 may also include a debug module 214. In an embodiment, a debug module may provide an interface and processing for performing debug operations (e.g., by a technician utilizing a debug device), such as identifying and removing defects that prevent correct operation of the merchant terminal 110 and the various components thereof.

Merchant terminal 110 may also include a wired interface 216, which may include any suitable interface for wired communication, such as USB, Lightning, FireWire, Ethernet, any other suitable wired communication interface, or any combination thereof, to perform, for example, the wired communication with other devices of the point-of-sale system 100 and payment servers (e.g., via a secure internet connection).

Merchant terminal 110 may also include a wireless communication interface 218. The wireless communication interface may include any suitable hardware and software for providing a wireless communication interface such as Bluetooth classic, Bluetooth low energy, WiFi, cellular, short message service (SMS), NFC, any other suitable wireless communication interface, or any combination thereof. In an example embodiment, the wireless communication interface may facilitate communications between the merchant terminal 110 and peripherals, as well as with payment servers (e.g., via a secure internet connection).

Figure 3:
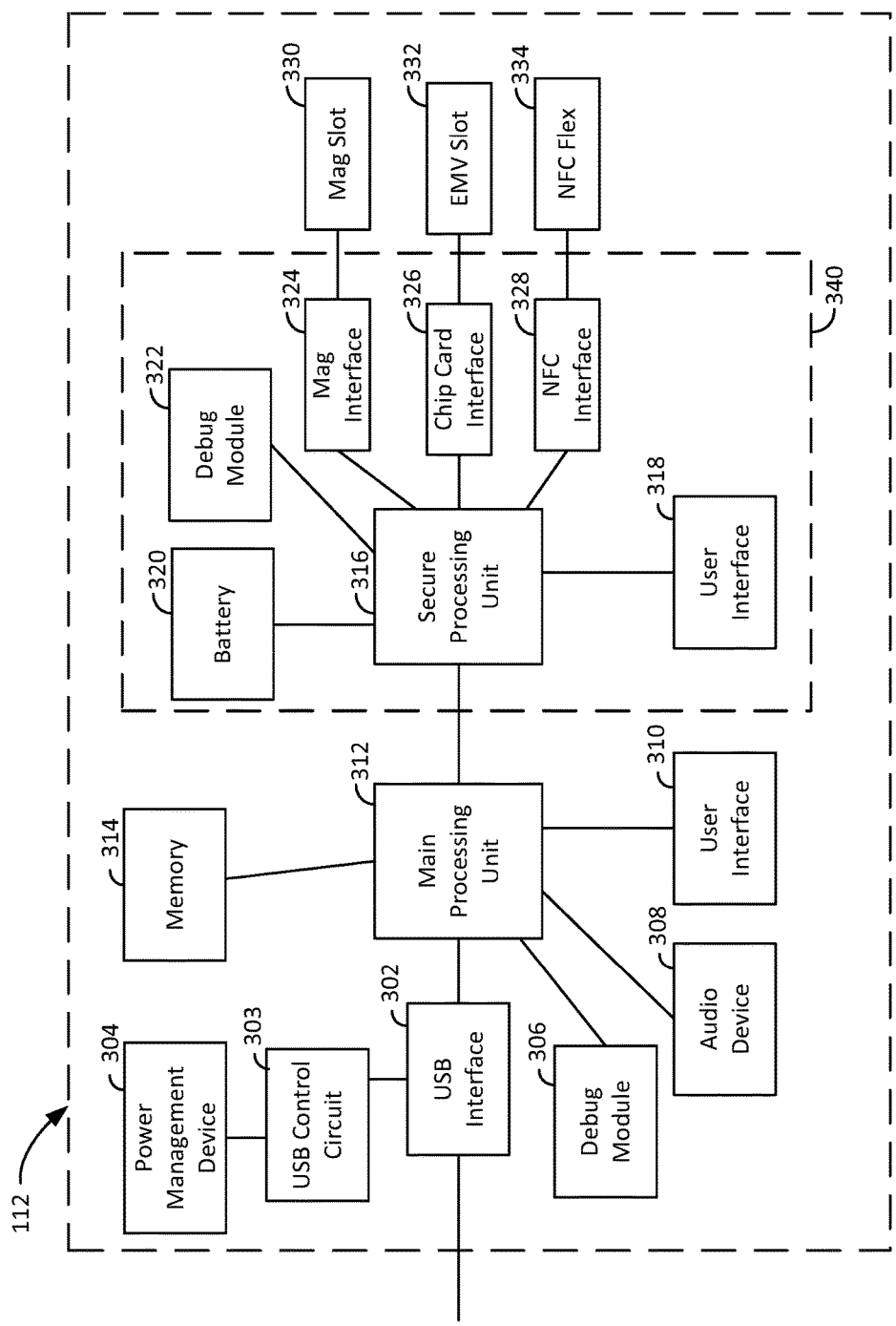
FIG. 3 depicts an illustrative block diagram of components of the customer terminal in accordance with some embodiments of the present disclosure.

FIG. 3 depicts a block diagram of an example customer terminal 112 in accordance with some embodiments of the present disclosure. Although particular components are depicted in a particular arrangement in FIG. 3, it will be understood that customer terminal 112 may include additional components, one or more of the components depicted in FIG. 3 may not be included in customer terminal 112, and the components of customer terminal 112 may be rearranged in any suitable manner. In one embodiment, customer terminal 110 may comprise a USB interface 302, a power management device 304, a debug module 306, an audio device 308, a user interface 310, a main processing unit 312, a memory 314, a secure enclave 340, a magnetic swipe slot 330, an EMV slot 332, and an NFC flex circuit 334.

Main processing unit 312 of customer terminal 112 may include a processor capable of performing the processing functions of the customer terminal 112 as described herein, and may be embodied by any suitable hardware, software, memory, and circuitry as is necessary to perform those functions. Main processing unit 312 may include any suitable number of processors, and may perform the operations of customer terminal 112 based on instructions in any suitable number of memories and memory types. In an example embodiment, the main processing unit 312 may be a System-on-Chip (SoC) processer having a dual-core processor (e.g., a Dual core ARM Cortex A7/A9).

Main processing unit 312 may execute instructions stored in memory 314 of customer terminal 112 to control the operations and processing of customer terminal 112, and the memory 314 may also store information necessary for the operation of customer terminal 112. In an example embodiment, memory 314 may include a flash memory and a RAM memory (e.g., a 16 GB eMMC NAND flash and a 2 GB LPDDR3 RAM).

USB interface 302 may provide for a connection to the merchant terminal 110 in order to receive power from merchant terminal 110 and to communicate with the merchant terminal 110. Although any type of USB connector and interface may be used in accordance with the present disclosure, in an embodiment USB interface 302 may be a USB type B receptacle for interfacing with a micro USB type B connector of a USB connector (e.g., USB connector 106 or 108, for connecting to merchant terminal 110). In some embodiments (not depicted in FIG. 2), merchant terminal may include additional wired or wireless interfaces such as additional USB ports, Lightning, Firewire, Ethernet, WiFi, Bluetooth, etc.

Although power may be provided to customer terminal 112 in any suitable manner, in an embodiment DC power may be provided from merchant terminal 110 when it is connected to the customer terminal 110 via the USB interface 302. A USB control circuit 303 may include circuitry for interacting with the merchant terminal 110 to receive the incoming DC power signal and to distribute that signal to other components of the customer terminal 112 (e.g., via power management device 304). In some embodiments, USB control circuit may enable additional functionality, such as initiating a reprogramming mode for the customer terminal based on a received voltage at USB interface 302 (e.g., at an ID pin of USB interface 302). A power management device 304 (e.g., a discrete power management integrated circuit) may receive power provided from merchant terminal 110 through the USB interface 302 and USB control circuit 303, and may perform functions related to power requirements of the customer system (e.g., DC to DC conversion, battery charging, linear regulation, power sequencing and other miscellaneous system power functions).

Customer terminal 112 may also include a user interface 310. User interface 210 may provide various interfaces and outputs to the customer terminal 112 to be viewed by a customer. An example user interface 310 may include hardware and software for interacting with a customer, such as a touchscreen interface, voice command interface, keyboard, mouse, gesture recognition, any other suitable user interface, or any combination thereof. In one embodiment, the user interface 310 may be a touchscreen interface that displays an interactive user interface for the customer to engage in purchase transactions (e.g., select items for purchase, answer queries, confirm purchases, provide PINS and signatures, etc.) at the customer terminal 112.

Customer terminal 112 may also include an audio device 308. Audio device 308 may provide audio for the customer terminal 112. An example audio device 308 may comprise an audio amplifier and a speaker for providing appropriate audio for the customer terminal 112.

Customer terminal 112 may also include a debug module 306. In an embodiment, a debug module 306 may provide an interface and processing for performing debug operations (e.g., by a technician utilizing a debug device), such as identifying and removing defects that prevent correct operation of the merchant terminal 110 and the various components thereof.

The secure enclave 340 may be a secure portion of the customer terminal 112 that performs critical functionality such as interacting with payment devices and cryptography, and that stores sensitive information such as cryptographic keys, passwords, and user information. In an embodiment, the secure enclave 240 may be located in a distinct location of the customer terminal 112 to isolate the secure enclave 240 from other circuitry of the customer terminal and to allow protective measures (e.g., tamper detection switches, anti-tamper meshes, anti-tamper domes, isolated compartments, etc.) to be installed around the secure enclave (not depicted in FIG. 3). In an example embodiment, the secure enclave may be situated at a base of the customer terminal in a manner that provides additional clearance for protective measures.

In an embodiment, the secure enclave 340 may include a secure processing unit 316, a user interface 318, a battery 320, a debug module 322, a magnetic swipe interface 324, a chip card interface 326, and an NFC interface 328.

Although secure processing unit 316 may be implemented with any suitable processor, hardware, software, or combination thereof, in an embodiment secure processing unit 316 may be implemented as microcontroller such as the K21 microcontroller unit (MCU) supplied by Freescale Semiconductor, Inc. Secure processing unit 316 may perform transaction processing and cryptographic operations, based on instructions and information (e.g., customer data, encryption keys, etc.) stored in a memory of secure processing unit 316 (not separately depicted in FIG. 3), which may be any suitable memory as described herein. Secure processing unit 316 may communicate with main processing unit 312 in order to receive and respond to requests for processing of payment information. Communications may be performed using any suitable internal bus and communication technique (e.g., UART, SPI, I²C, and GPIO). In The secure enclave 340 of customer terminal 112 may also include a battery 320. In some embodiments, the battery may function as a primary power source to certain components of the secure enclave 340 (e.g., memory storing critical payment, customer, and encryption information), such that when the battery power is removed the information is lost. The battery may function in this manner in response to a tamper attempt, such that in response to the tamper attempt the secured information is destroyed.

The secure enclave 340 of customer terminal 112 may also include a debug module 322. In an embodiment, a debug module 322 may provide an interface and processing for performing debug operations (e.g., by a technician utilizing a debug device) directly with the components of the secure enclave.

The secure enclave 340 of customer terminal 112 may also include a user interface 318. In an embodiment, user interface 318 (e.g., a keypad, touchscreen, etc.) may located within the secure enclave such that certain content is provided to the secure enclave 340 rather than the general processing circuitry of the customer terminal 112. In this manner, critical information such as PIN numbers, signatures, and passwords may be provided only to the secure enclave 340 in the first instance, and then forwarded to the main processing unit 312 in encrypted or unencrypted form, as required.

Secure enclave 340 of customer terminal 112 may also include a magnetic swipe interface 324, chip card interface 326, and NFC interface 328. Each of these components may include interface circuitry for receiving and processing signals from a payment interface, such as a magnetic reader head 330, a chip card slot 332 (e.g., providing power and communications to the chip card), and an NFC transceiver, components of which may be located on an NFC flex circuit 334 remote from secure enclave 340. For example, if a secure enclave 340 is located at the base of the customer terminal 112, it may be desired for the NFC antenna and certain related circuitry (e.g., voltage boost circuitry, matching circuitry, EMC circuitry, the NFC antenna, and receive filters and amplifiers) to be located at a different location of the customer terminal 112 remote from the secure enclave 340, such as at a NFC tap target near the top center of the customer terminal.

Figure 4:
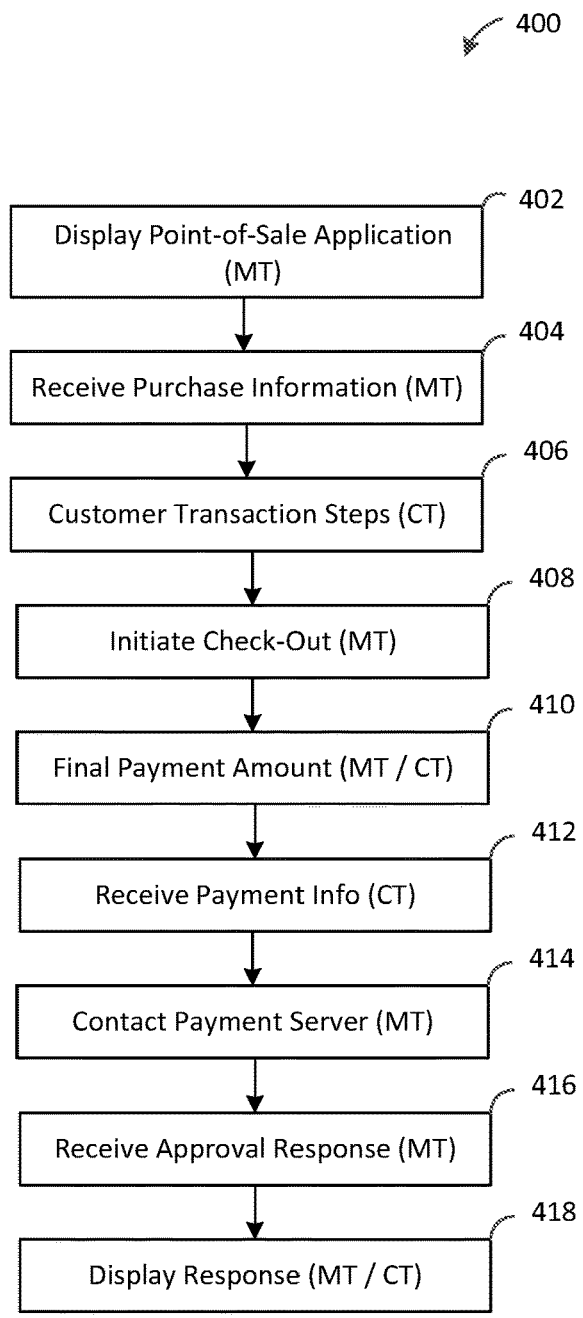
FIG. 4 depicts exemplary steps for performing a payment transaction with a merchant terminal and a customer terminal in accordance with some embodiments of the present disclosure.

FIG. 4 depicts example steps 400 for performing a payment transaction with a merchant terminal 110 and a customer terminal 112 in accordance with some embodiments of the present disclosure. While, for purposes of simplicity of explanation, the methods described herein are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

At step 402, the point-of-sale application to be displayed at user interface 210 of merchant terminal 110. The point-of-sale application may display information such as items available for sale, specials, coupons, available inventory, combinations, and other similar information that may be used to guide a merchant user through a transaction. Processing may then continue to step 404.

At steps 404, merchant terminal 110 may receive purchase information from the user interaction with the point-of-sale application of the user interface 210, such as selections of items for purchase, selections of optional purchases, and other information regarding a purchase. Once the purchase information has been received, processing may continue to step 406.

In some embodiments, at step 406, merchant terminal 110 may communicate with customer terminal 112 to perform a portion of the transaction steps. For example, a customer may interact with user interface 310 of customer terminal 310 to select items to purchase, select options, enter coupons, enter customer or loyalty information, confirm a purchase, or perform other similar tasks. Once the merchant terminal 110 and customer terminal 112 have completed any required communications, processing may continue to step 408.

At step 408, the merchant terminal 110 may complete the transaction selections based on the inputs and information received at steps 404 and 406 in order to initiate a check-out procedure. At this point in the transaction, required amounts such as tax and tip may be added to the purchase amount, such that the transaction may be completed. Processing may then continue to step 410.

At step 410, the merchant terminal 110 may provide a final payment amount to the customer terminal 412 and request that the customer provide a payment method. Information relating to the transaction and instructions may be provided to the customer at user interface 310 of the customer terminal 112. Processing may then continue to step 412.

At step 412, the customer terminal may receive payment information from the customer via one of the magnetic stripe slot 330, chip card slot 332, or NFC antenna of NFC flex circuit 334. In some embodiments, user inputs such as PIN number, password, or signature may also be provided at user interface 318. The secure enclave 340 may process and encrypt the received payment information and provide it to merchant terminal 110. Processing may then continue to step 414.

At step 414, the merchant terminal 110 may contact a payment server or similar remote entity in order to determine whether the transaction is authorized. In an embodiment, the merchant terminal 110 may transmit the encrypted payment information as well as other information about the transaction to the payment via a communication interface such as wired interface 216 or wireless interface 218. Processing may then continue to step 416.

At step 416, merchant terminal 110 may receive a response from the payment server, such as an approval or denial of the transaction. Processing may then continue to step 418, at which notice of the approval or denial may be provided to the merchant and customer via user interface 210 of merchant terminal 110 and the customer via user interface 310 of customer terminal 112.

Figure 5:
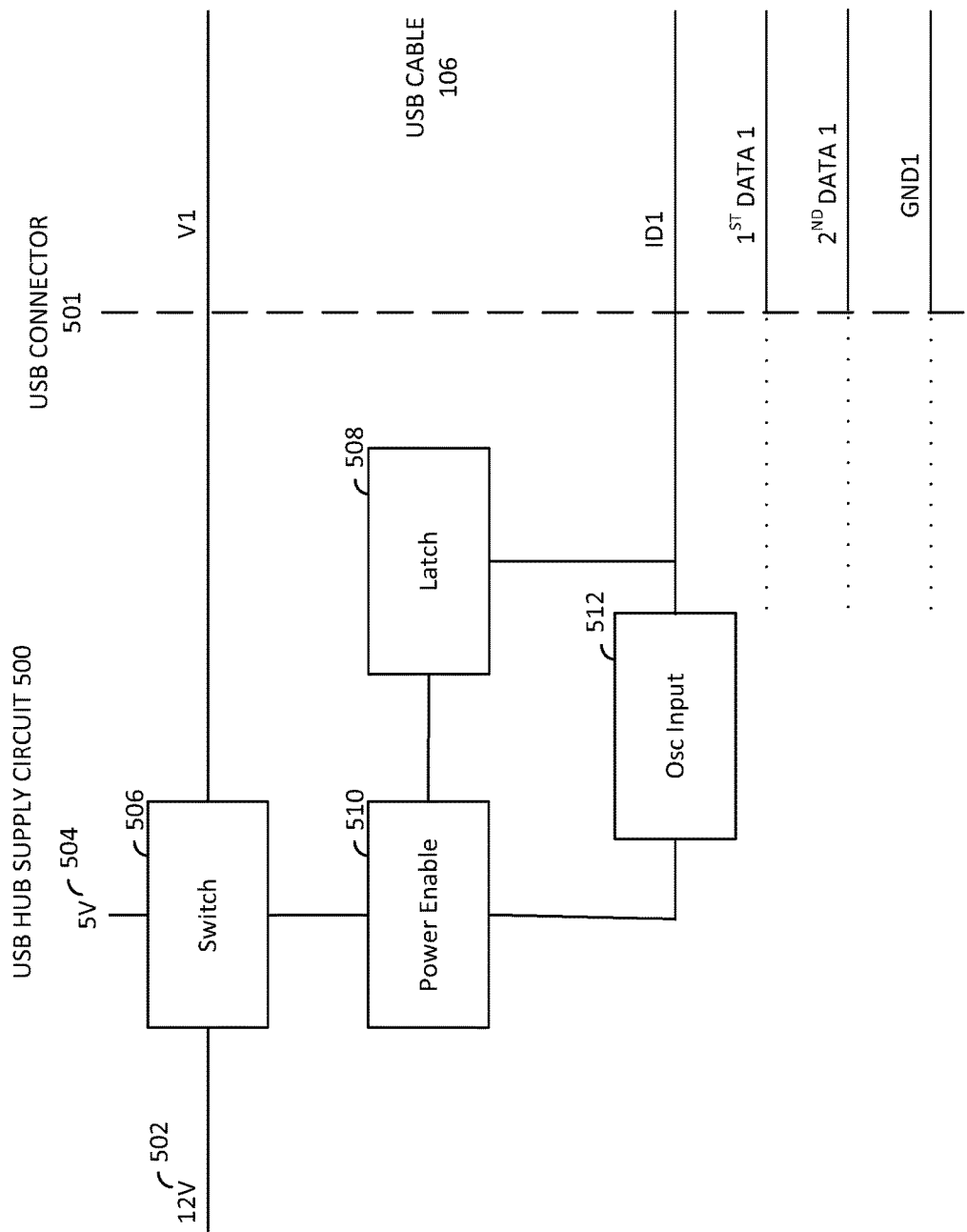
FIG. 5 depicts an exemplary block diagram of certain components of a USB hub in accordance with some embodiments of the present disclosure.

FIG. 5 depicts an example block diagram of certain components of a USB hub in accordance with some embodiments of the present disclosure. The components of FIG. 5 that are depicted in FIG. 5 allow a USB hub power supply circuit 500 to selectively provide a power supply voltage (e.g., power supply voltage 502) to other devices (e.g., to merchant terminal 110) via a cable such as a USB cable (e.g., USB cable 106). The power supply voltage 502 may be an increased or non-standard voltage (e.g., 12 volts) than a standard supply voltage (e.g., 5 volts at standard voltage supply 504) that is normally transmitted over the USB cable. Although 12 volts and 5 volts are used as examples of power supply voltages in the present disclosure, it will be understood that various power supply voltages may be utilized in accordance with the present disclosure, based on the requirements of the other devices (e.g., voltage/current/power) and the ratings of related components (e.g., USB cables, USB interfaces, etc.). The USB cable 106 may be any suitable USB cable type as described herein, and in an embodiment, may include a voltage line, an ID line, a $1^{st}$ data line, a $2^{nd}$ data line, and a ground line. For purposes of the present disclosure, the various lines of USB cable 106 may be followed by a "1" to distinguish from the same lines of the USB cable 108, which are followed by a "2."

By selectively providing the power supply voltage 502 to the merchant terminal 110, the merchant terminal may not require a separate power source, and may continue to communicate with other USB devices attached to the hub 104 (e.g., cash drawer, receipt printer, etc.) via the data lines of the USB cable 106 (e.g., $1^{st}$ data line 1 and $2^{nd}$ data line 1). As described herein, this functionality may be performed by the merchant terminal providing an oscillating signal over the ID line (e.g., ID1) via USB cable 106 which is attached to the USB hub power supply circuit 500 via USB connector 501, and USB hub power supply circuit 500 then providing power to the merchant terminal 110 over the voltage line (e.g., V1) via USB connector 501 and USB cable 106. Although USB hub power supply circuit 500 may selectively supply power based on a variety of components and configurations, in an embodiment the hub power supply voltage circuit 500 may include power supply switch 506, oscillator input 512, power enable switch 510, and latch 508.

At startup and in the absence of a merchant terminal 110 having appropriate complementary circuitry (e.g., as described in FIGS. 6 and 9 herein), the power supply switch 506 may be in a state such that the standard power supply 504 is provided to the voltage line V1, and the power supply voltage 502 is not provided to voltage line V1. In this state, any suitable USB device may be connected to USB connector 501 and will be provided a standard 5 volt power supply, allowing these other USB devices to function normally when connected to the USB hub.

As described herein, if a merchant terminal 110 is connected to USB connector 501 via USB cable 106 during this normal operating state, the standard supply voltage 504 may be provided to the merchant terminal 110 via the voltage line V1. In response to receiving the standard supply voltage 504, the merchant terminal may—assuming that it is not already receiving a power supply from another power source such as another USB hub—provide an oscillating (approximately 5 volt) signal on the ID1 line via USB cable 106 and USB connector 501. This signal may be provided to both the oscillator input 512 and the latch 508.

Figure 8:
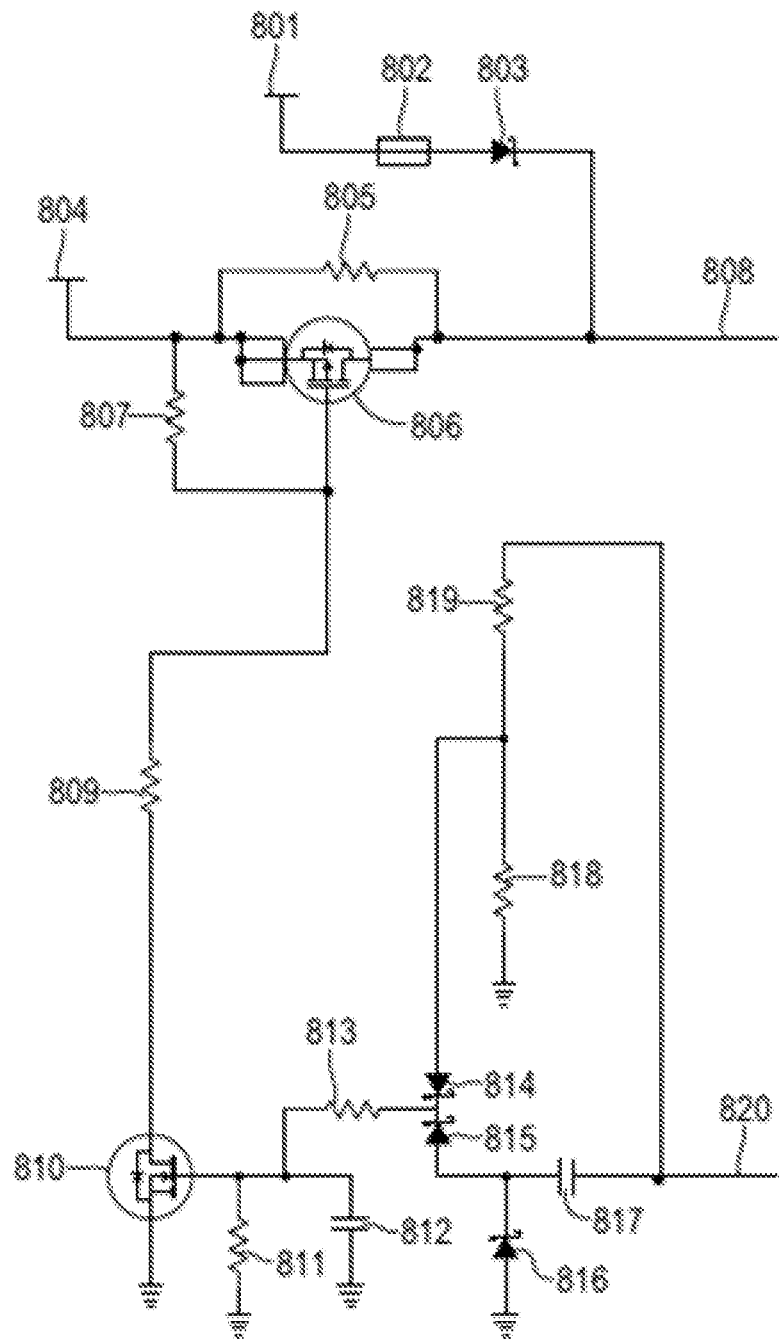
FIG. 8 depicts an exemplary schematic diagram of certain components of a USB hub in accordance with some embodiments of the present disclosure.
Figure 9:
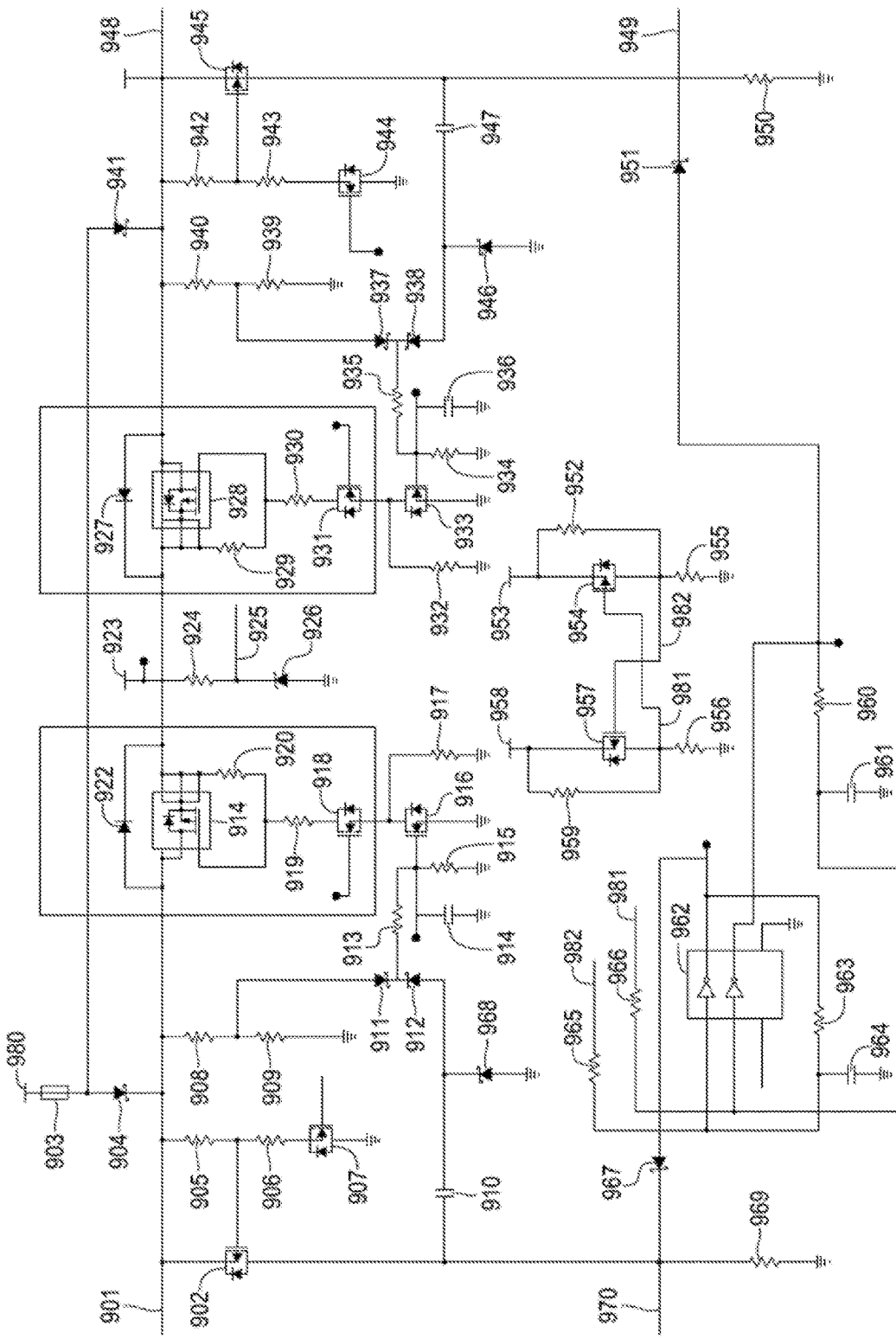
FIG. 9 depicts an exemplary schematic diagram of certain components of a merchant terminal in accordance with some embodiments of the present disclosure.

In an embodiment, the oscillator input may be configured in such a manner that an oscillating signal having an appropriate frequency may be filtered such that it approximates a DC voltage having a magnitude that approximates the peak voltage of the oscillating signal (e.g., based on appropriate diodes and capacitors forming peak detector circuits, as depicted for diodes 814/912/938 and capacitors 812/914/934 in FIGS. 8 and 9). This output may be provided to the power enable switch 510. The latch, on the other hand, may include components and filtering that blocks the oscillating signal (e.g., any oscillating signal, or an oscillating signal within the frequency range) from being passed to the power enable switch 510.

As a result of an oscillating signal within the appropriate ranges of peak-to-peak voltage, frequency, and duty cycle, the oscillator input 512 may output an approximate DC signal within a range that causes the power enable switch 510 to output a signal that enables the power supply switch 506. The latch, on the other hand, may output a signal that does not cause the power enable switch 510 to operate. However, because the power enable switch 510 may be responsive to the output of either of the latch 508 or oscillator input 512, the power enable switch 510 may provide the enabling signal to the power supply switch 506 based on the output from the oscillator input 512. The power supply switch 506 may then supply the power supply voltage 502 to the voltage line V1 and thus to the merchant terminal via USB connector 501 and USB cable 106.

As described herein, once the voltage line of the merchant terminal 110 is connected to the power supply voltage 502 (e.g., at voltage line V1 via USB connector 501 and USB cable 106), the behavior of the merchant terminal may change. In an embodiment, the signal that is provided by the merchant terminal 110 on the ID line ID1 (e.g., via USB connector 501 and USB cable 106) may be changed from an oscillating signal to an enabling DC signal (e.g., a signal at approximately 3.3 volts DC). This enabling DC signal may be in a range that is non-standard for the ID pin, and thus, is not used by standard USB devices. This signal may be provided to both the oscillator input 512 and the latch 508.

In an embodiment, the oscillator input 512 may be configured in such a manner that a DC signal may be blocked by the oscillator input 512. The latch 508, on the other hand, may include components and filtering that allows a DC output signal to be provided to the power enable switch 510 in response to a DC signal being provided on the ID1 line. This output from the latch 508 causes the power enable switch 510 to output a signal that enables the power supply switch 506, such that the power supply voltage 502 continues to be provided to the merchant terminal 110. If the merchant terminal 110 is disconnected from the USB hub 104, neither the oscillating signal nor the enabling DC signal will be provided to the latch 508 or oscillator input 512. The power enable switch 510 may cease to provide an enabling input to power supply switch 506, and the power supply switch 506 may return to providing 5 volts to the line V1. If a standard USB device is coupled to the USB connector 501, it will not send either the oscillating signal or the enabling DC signal, and the power supply switch will continue providing the 5 volts from standard power supply 504.

Figure 6:
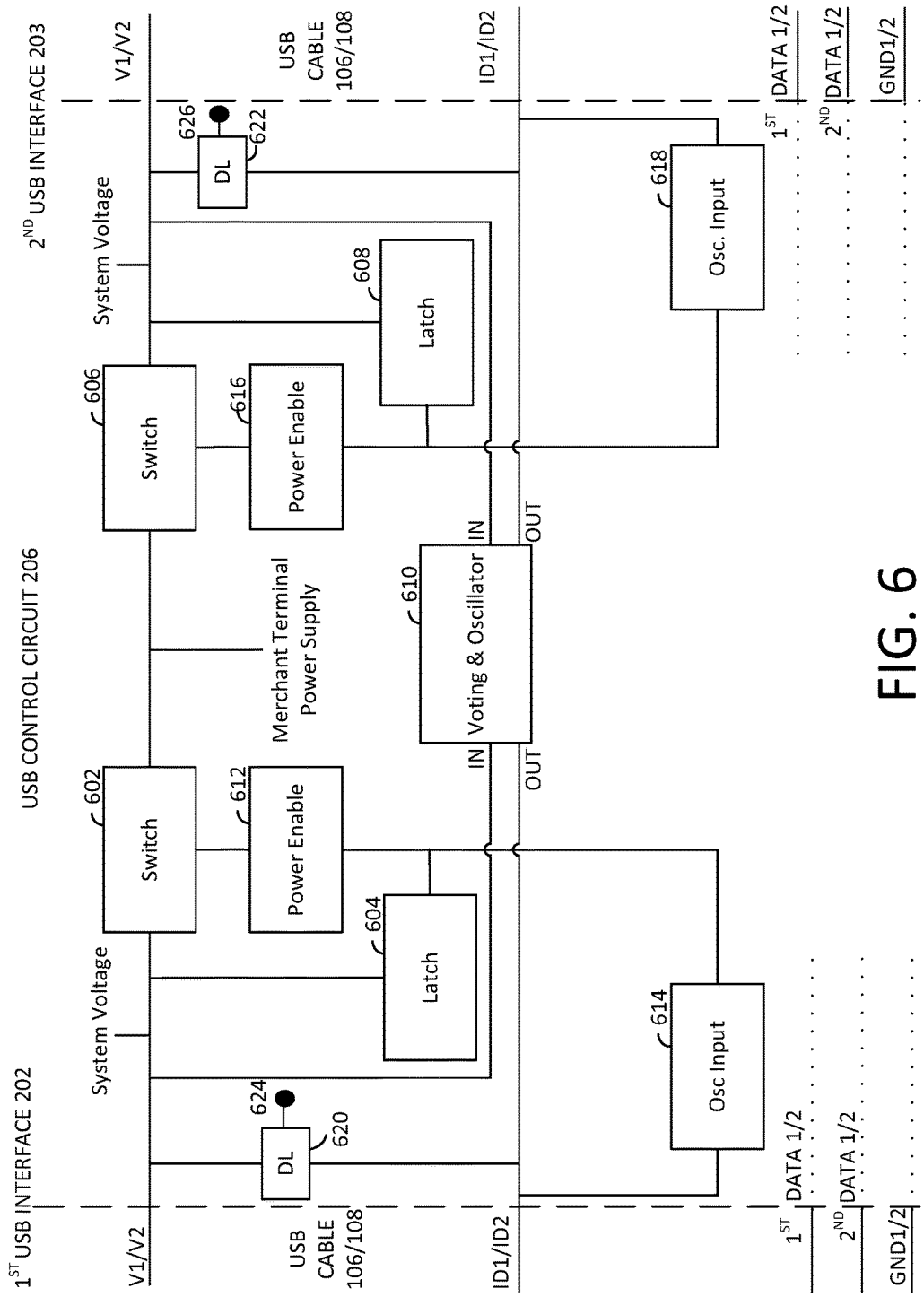
FIG. 6 depicts an exemplary block diagram of certain components of a merchant terminal in accordance with some embodiments of the present disclosure.

FIG. 6 depicts an example block diagram of certain components of a merchant terminal 110 in accordance with some embodiments of the present disclosure. The components depicted in FIG. 6 comprise a mirrored architecture with two identical USB interfaces (e.g., first USB interface 202 and second USB interface). Either a USB hub 104 or a customer terminal 112 may be attached to either of the USB interfaces 202/203 and the merchant terminal 110 will interact properly with both devices. Both of the USB interfaces 202/203 are coupled to the USB control circuit 206, which may enable the mirrored architecture and allow the merchant terminal 110 to perform various functions.

Although any suitable functions may be performed by the USB control circuit 206 of merchant terminal 110 in accordance with the present disclosure, in an embodiment the functions may include enabling a power supply voltage to be provided to the merchant terminal 110 (e.g., by sending an oscillating signal over the ID line to USB hub 104) via either of the USB interfaces 202/203, providing the power supply voltage to the customer terminal 112 (e.g., based on receiving an oscillating signal over the ID line) via either of the USB interfaces 202/203, and providing a programming voltage to initiate programming of the customer terminal (e.g., by sending the programming voltage over the ID line) via either of the USB interfaces 202/203. Although the USB control circuit 206 may perform these functions using a variety of components and configurations, in an embodiment the USB control circuit may include voting and oscillating circuit 610, latches 604/608, power enable switches 612/616, power supply switches 602/606, oscillator inputs 614/618, and download switches 620/622.

The mirrored architecture allows either the USB hub 102 or the customer terminal 112 to be connected to either of USB interface 202 or USB interface 202 (e.g., via USB cable 106 and USB cable 108, respectively). The functionality of the USB control circuit 206 may be performed based on connections to these other devices via the voltage lines (e.g., V1 and V2) and ID lines (e.g., ID1 and ID2), while USB interfaces 202/203 may also provide connections and routing for other lines of the USB interfaces (e.g., first and second data lines and ground lines). For purposes of describing the embodiment of FIG. 6, it will be assumed that USB hub 104 (e.g., as described in FIGS. 5 and 8) is coupled to the first USB interface 202 via USB cable 106 and that the customer terminal 112 (e.g., as described in FIGS. 7 and 10) is coupled to the second USB interface 203 via USB cable 108.

Initially, merchant terminal 110 may not have power, and none of the circuitry (e.g., with the exception of certain low-power battery operated operations) may be enabled. As described for the USB hub 104, a standard supply voltage such as 5 volts may initially be provided to the voltage line (e.g., V1, at the left hand side of FIG. 6) of the first USB interface 202 by the USB hub 104. The voltage line of first USB interface 202 may be coupled to the download switch 620, latch 604, power supply switch 602, and voting and oscillating circuit 610. This standard supply voltage may not cause any of the download switch 620, latch 604, or power supply switch 602 to change its state. Voting circuit and oscillator circuit 610 may be coupled to the voltage lines of each of USB interface 202 and USB interface 203 (e.g., at the IN pins of the voting and oscillator circuit 610).

When a voltage exceeding a threshold voltage (e.g., approximately 3.3 volts) arrives at one of the IN pins, the voltage and oscillator circuit 610 may output the oscillating signal at the corresponding OUT pin, thus providing the oscillating signal to the ID line. In an embodiment where the standard supply voltage is provided to the voting and oscillator circuit 610 from the voltage line of the first USB interface 202 (e.g., from the USB hub 104 and USB cable 106), the oscillating signal may be provided to the ID line of the first USB interface 202, and from there to the ID1 input of the USB hub 104 via USB cable 106. As described herein, the oscillating signal may have a voltage (e.g., approximately 3.3 volts), a frequency (e.g., approximately 10 kHz-15 kHz), and duty cycle (e.g., 50%) that allows corresponding oscillator input 512 of the USB 104 hub to turn on the power enable switch 510 and power supply switch 506, which causes the power supply voltage 502 (e.g., 12 volts) to be provided to the voltage pin of first interface 202 of the merchant terminal via the USB cable 106.

Once the power supply voltage 502 (e.g., 12 volts) arrives at the voltage pin of the first power interface, that voltage may be sufficient for the latch 604 to send an enabling signal to power enable switch 612. Power enable switch 612, in turn, may provide an enabling signal to power supply switch 602, which connects the power supply voltage 502 from the voltage pin of first USB interface 202 to the merchant terminal power supply. At this point the power supply switch 606 may not be enabled, such that the power supply voltage 502 is not provided to the voltage line of the second USB interface 203, or to any of the components connected thereto (e.g., latch 608, download switch 622, or the right-side IN pin of the voting and oscillator circuit 610).

The same operations described herein for a USB hub first coupled to the first USB interface 202 would also be performed in a similar manner if USB hub 104 were first coupled to the second USB interface 203. The voting portion of the voting and oscillator circuit causes the oscillating signal to only be output to the same USB interface (202 or 203) that first supplies the enabling voltage to the voting and oscillator circuit 610. Once the enabling voltage is received and the oscillating signal is being output, the voting and oscillator circuit 610 "locks in" and the oscillating signal will not be sent to the other USB interface (202 or 203). Thus, if the standard supply voltage signal 504 were first supplied to the voltage line of second USB interface 203, the voting and oscillator circuit 610 would send the oscillating signal to the ID line of the second USB interface 203, the power supply voltage would be received at the voltage line of the second USB interface 203, the latch 608 would cause the power enable switch 612 and power supply switch 606 to turn on, and the power supply voltage 502 would be provided from the voltage line of second USB interface 203 to the merchant terminal power supply via the power supply switch 606.

Returning to an example embodiment wherein the USB 104 hub is first connected to the first USB interface 202 of merchant terminal 210, a system voltage (e.g., 5 volts) may be provided to the voltage line of the second USB interface 203, even though the power supply switch 606 is not yet enabled. In an embodiment, the system voltage may be approximately the same as a standard supply voltage 504 that would be provided from USB hub 104. The system voltage may be enabled whenever the power supply voltage 502 has been provided to the merchant terminal power supply. Although not depicted in FIG. 6, blocking circuitry may prevent the power supply voltage from being provided as the system voltage when the power supply voltage is on the voltage line, but may provide the system voltage to the voltage line when the power supply voltage is not connected. In the embodiment described herein, because the power supply voltage 502 has been provided to the merchant terminal power supply via the power supply switch 602, but the power supply switch 606 is not on, the system voltage (e.g., 5 volts) may be provided to the voltage pin of the second USB interface 203.

In the example embodiment described herein, the second USB interface 203 may be coupled to the customer terminal 112 via the USB cable 108. The customer terminal may have an oscillating circuit that is enabled by the system voltage, and that provides an oscillating signal to the ID line of the second USB interface 203. The oscillating signal provided by the customer terminal may have a voltage (e.g., approximately 3.3 volts), a frequency (e.g., 10 kHz-15 kHz), and duty cycle (e.g., approximately 50%) that allows corresponding oscillator input circuit 618 to provide an enabling signal to the power enable switch 616, in a similar manner as described herein with respect to oscillator input 512 of the USB hub 104. The power enable switch 616 may provide an enabling signal to the power supply switch 606, which may provide the merchant terminal power supply voltage (e.g., at the power supply voltage 502) to the voltage line of the second USB interface 203, and via the USB cable 608, to the customer terminal 112. It will be understood that as a result of the mirrored architecture of the merchant terminal 110, the power supply voltage 502 may be first provided to the second USB interface 203 by a USB hub 104, and a customer terminal 112 may be connected to the first USB interface 202. In such an instance, the system voltage, oscillator input 614, power enable switch 612, and power supply switch 602 would function in the same manner to provide the power supply voltage 502 to the customer terminal 112 via the voltage line of the first USB interface 202.

The USB control circuit 206 may also include download switches 620 and 622. The download switch 620 may be coupled to logical input 624 and download switch 622 may be coupled to logical input 626. When an enabling input is provided to one of the logical input 624 or logical input 626, the respective download switch 620 or 622 may couple the respective voltage line (or a voltage derived therefrom) of the USB interface 202 or 203 to its ID line as a programming voltage. When a customer terminal 112 is coupled to the respective USB interface 202/203, this programming voltage is provided to the ID line of the customer terminal 112 and causes the customer terminal 112 to enter a programming mode, in which the merchant terminal 110 may modify the software of the customer terminal 112 (e.g., via the data lines of the USB cable).

Figure 7:
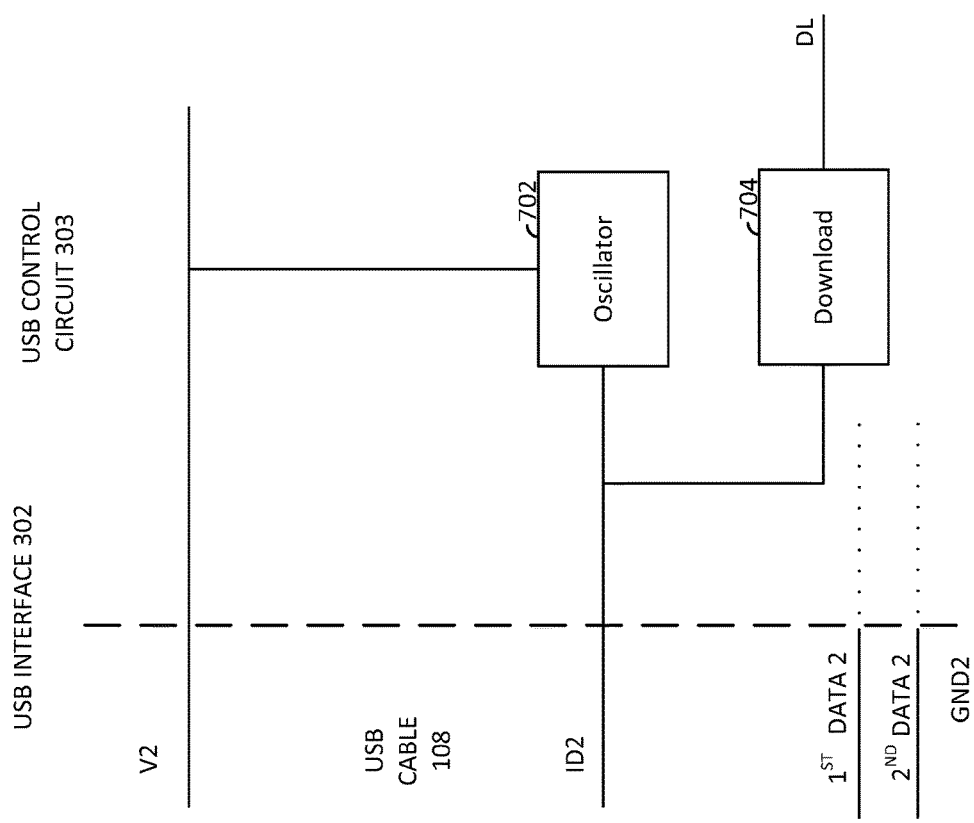
FIG. 7 depicts an exemplary block diagram of certain components of a customer terminal in accordance with some embodiments of the present disclosure.

FIG. 7 depicts an example block diagram of certain components of a customer terminal in accordance with some embodiments of the present disclosure. As described herein, the customer terminal 112 may include a USB interface 302 that couples to a USB cable 108, to connect to voltage line V2, ID line ID2, $1^{st}$ data line2, $2^{nd}$ data line 2, and ground line GND2. The voltage line V2 and ID line ID2 may be coupled to components of the USB control circuit. Although any suitable functions may be performed by the USB control circuit 302 of customer terminal 112 in accordance with the present disclosure, in an embodiment the functions may include enabling a power supply voltage to be received from the merchant terminal 110 (e.g., by sending an oscillating signal over the ID line to the merchant terminal 110) and receiving a programming voltage from the merchant terminal 110 to initiate programming of the customer terminal 112 (e.g., by receiving the programming voltage over the ID line). Although the USB control circuit 302 may perform these functions using a variety of components and configurations, in an embodiment the USB control circuit 302 may include an oscillator circuit 702 and a download circuit 704.

Initially, customer terminal 112 may not have power, and none of the circuitry (e.g., with the exception of certain low-power battery operated operations) may be enabled. The customer terminal 112 may become coupled to the merchant terminal 110 via the USB cable 108. As described herein, once the merchant terminal is connected to the power supply voltage 502, a system voltage (e.g., 5 volts) may be provided form the merchant terminal 110 to the voltage line V2 via the USB cable 108 and USB interface 302. The voltage line V2 may be coupled to the oscillator circuit 702 of the USB control circuit 702. When the voltage at the voltage line exceeds a threshold voltage (e.g., approximately 3.3 volts), oscillator circuit 702 may output an oscillating signal at the ID line ID2, which may be provided to one of the oscillator inputs 614 or 618 via the USB interface 302 and USB cable 108. In a similar manner to the oscillating signal of the merchant terminal, the oscillating signal may have a voltage (e.g., approximately 3.3 volts), a frequency (e.g., 10 kHz-15 kHz), and duty cycle (e.g., approximately 50%) that allows corresponding oscillator input 614 or 618 of the merchant terminal to turn on the power enable switch 612 or 616 and power supply switch 602 or 606, which causes the power supply voltage 502 (e.g., 12 volts) to be provided to the voltage pin V2 of the USB interface 302 of the customer terminal 112 via the USB cable 108. This power supply voltage may then be provided to the customer terminal 112 which may then allow the customer terminal to operate normally to process transactions.

The USB control circuit 303 may also include a download circuit 704, which may be coupled to the ID pin ID2 of USB interface 302, and via the USB cable 108, to one of the ID pins of the USB interfaces 202 or 204 of the merchant terminal 110. When one of the download switches 620 or 622 provides the programming voltage to the ID line ID2, the download circuit may provide an output signal DL that causes the customer terminal to enter a programming mode, in which the merchant terminal 110 may modify the software of the customer terminal 112 (e.g., via the data lines of the USB cable).

FIG. 8 depicts an example schematic diagram of certain components of a USB hub in accordance with some embodiments of the present disclosure. In an embodiment, groupings of the discrete components depicted in FIG. 8 may correspond to the power supply voltage 502, standard voltage supply 504, power supply switch 506, latch 508, power enable switch 510, and oscillator input 512, which are depicted and described with respect to FIG. 5. Although particular discrete components are depicted as corresponding to particular portions of FIG. 5 in the embodiment depicted in FIG. 8, it will be understood that each of the portions of FIG. 5 may be implemented in a variety of manners. In an embodiment, power supply voltage 804 may correspond to power supply voltage 502, standard supply voltage 801 may correspond to standard supply voltage 504, voltage line 808 may correspond to voltage line V1, and ID line 820 may correspond to ID line ID1.

Although oscillator input 512 may include any suitable components to convert an incoming oscillating signal into an appropriate DC voltage, in an embodiment the oscillator input may include capacitor 817, schottky diode 815, schottky diode 816, resistor 813, capacitor 812, and resistor 811. Collectively, the resistors 813 and 811 and capacitors 817 and 812 may provide an RC circuit having appropriate resistance and capacitance values (e.g., approximately 47 k ohms for resistor 813, approximately 470 k ohms for resistor 811, approximately 1 μF for capacitor 812, and approximately 1 nF for capacitor 817) to receive the oscillating signal at ID line 820 and provide a substantially DC signal to the gate of MOSFET 810. Schottky diode 815 may block current that passes through Schottky diode 814 from conducting to capacitor 817 and ID line 820. Similarly, Schottky diode 815 may block current that passes through Schottky diode 815 from conducting to resistors 818 and 819.

Although latch 508 may include any suitable components to provide a DC voltage from ID line 820 to the power enable switch 510, in an embodiment the latch may include resistors 818 and 819 which function as a voltage divider to provide a voltage-divided version of a DC voltage on ID line 820 to the gate of MOSFET 810 (via schottky diode 814 and resistor 813, with filtering provided by capacitor 812 and resistor 811).

Although power enable switch 510 may include any suitable components to provide an enabling signal to the power supply switch 506 (e.g., a low-voltage enabling signal if MOSFET 806 is a p-channel MOSFET), in an embodiment the power enable switch 510 may include n-channel MOSFET 810 and resistor 809. The gate of MOSFET 810 may be coupled to the outputs of both the latch 508 and the oscillator input 512, the source may be coupled to ground, and the drain may be coupled to resistor 809, and through resistor 807, to the power supply voltage 804. When the substantially DC voltage from either of the latch 508 or the oscillator input 512 exceeds the threshold voltage of MOSFET 810, current may flow from the drain of MOSFET 810 to the source (e.g., to ground), creating a voltage divider at the gate of MOSFET 806 based on the voltage of the power supply voltage 804 and the values of resistors 807 and 809.

Although power supply switch 506 may include any suitable components to selectively provide either the power supply voltage 804 or the standard supply voltage 801 to the voltage line 808, in an embodiment the power enable switch may include resistors 805 and 807, p-channel MOSFET 806, fuse 802, and schottky diode 803. The gate of MOSFET 806 may be coupled to the resistor 809 of power enable switch 510 and to resistor 807. The source of MOSFET 806 may be coupled to the other terminal of resistor 807, the power supply voltage 804, and a first terminal of resistor 805. The drain of MOSFET 806 may be coupled to the other terminal of resistor 805, to schottky diode 803, and to voltage line 808.

When MOSFET 810 is not conducting, the gate voltage of MOSFET 806 may essentially be held at the same voltage as the source, based on resistor 807. The standard supply voltage 801 is provided at voltage line 808 via fuse 802 and schottky diode 803, and the resistor 805 has a voltage corresponding to the voltage drop between the power supply voltage 804 and the standard supply voltage 801. When MOSFET 810 is conducting, the voltage at the gate of MOSFET 806 drops based on the voltage divider of resistors 807 and 809, causing the MOSFET 806 to conduct. The power supply voltage 804 is thus provided to the voltage line 808, while the schottky diode 803 blocks current from conducting toward standard supply voltage 801.

FIG. 9 depicts an example schematic diagram of certain components of a merchant terminal 110 in accordance with some embodiments of the present disclosure. In an embodiment, groupings of the discrete components depicted in FIG. 9 may correspond to the voting and oscillator circuit 610, latches 604 and 608, oscillator inputs 614 and 618, power enable switches 612 and 616, power supply switches 602 and 606, and download switches 620 and 626. Although particular discrete components are depicted as corresponding to particular portions of FIG. 6 in the embodiment depicted in FIG. 9, it will be understood that each of the portions of FIG. 9 may be implemented in a variety of manners. In an embodiment, voltage line 901 may correspond to the voltage line of the first USB interface, ID line 970 may correspond to the ID line of the first USB interface, voltage line 948 may correspond to the voltage line of the second USB interface, and ID line 949 may correspond to the ID line of the second USB interface.

As described herein, when a merchant terminal 110 is initially coupled to a USB hub 104 via one of the USB cables 106 or 108, a standard voltage supply 801/504 (e.g., approximately 5 volts) is provided to the voltage line (i.e., voltage line 901 or 948) of one of the first USB interface 202 or the second USB interface 203. As described herein, this standard supply voltage is provided to the voting and oscillator circuit 610. Although the voting and oscillator circuit 610 may include any suitable components to select the correct voltage line and provide an oscillating signal to its corresponding ID line, in an embodiment the voting portion of the voting and oscillator circuit 610 may include voltage line input 958, voltage line input 953, voting resistors 959, 952, 955 and 956, and p-channel MOSFETS 954 and 957. The oscillator portion of the voting and oscillator circuit 610 may include inverter 962, resistors 965, 966, 960, and 963, capacitors 961 and 964, and schottky diodes 967 and 951.

Voltage line input 958 may be coupled to voltage line 901 and voltage line input 953 may be coupled to voltage line 948. Prior to the standard voltage supply being provided to one of the voltage lines 901 or 948 (and a ground being supplied via either of the USB interfaces), both of the MOSFETs 954 and 957 are not conducting. Once one of the USB interfaces 202/203 is connected the standard supply voltage and to ground (e.g., by connecting to a USB hub 104), the gates of both of the MOSFETs 954 and 957 are coupled to ground via resistors 955 (the gate of MOSFET 957) and 956 (the gate of MOSFET 954). Only one of the first voltage line 958 or second voltage line 953 is coupled to the standard supply voltage 801/504 (e.g., approximately 5 volts), based on which of the voltage line 901 or voltage line 948 is coupled to the USB hub 104.

If voltage line input 958 received the standard supply voltage, the standard supply voltage is supplied to the source of MOSFET 957 while the gate of MOSFET 957 is coupled to ground via resistor 955. If voltage line input 953 received the standard supply voltage, the standard supply voltage is supplied to the source of MOSFET 954 while the gate of MOSFET 954 is coupled to ground via resistor 956. The p-channel MOSFET that is first placed in this condition will conduct, shorting over its associated resistor (e.g., resistor 959 at MOSFET 957, or resistor 952 at MOSFET 954). This provides the standard supply voltage (or later, the power supply voltage) to the drain of the conducting MOSFET (e.g., drain voltage 981 for MOSFET 957, or drain voltage 982 for MOSFET 954). This voltage, in turn, is provided as the gate voltage at the other MOSFET, ensuring that the other MOSFET does not conduct. The non-conducting MOSFET is in parallel to a resistor, which will cause a voltage drop when a voltage is eventually supplied to the second of voltage line input 958 and voltage line input 953, retaining the conducting MOSFET in its conducting state and its associated drain voltage (e.g., either drain voltage 981 or drain voltage 982) at the voltage of the associated voltage line input (e.g., voltage line input 958 for drain voltage 981 or voltage line input 953 for drain voltage 982).

The drain voltages 981 and 982 may be provided to the oscillator portion of the voting and oscillator circuit 610. One of drain voltages 981 or 982 will be at a ground voltage, while the other will be at the standard supply voltage. Whichever one of 981 or 982 that is connected to ground initially grounds an input of inverter 962 through resistor 965 or 966. The inverter 962 outputs a high voltage (e.g., the standard supply voltage) in response to the ground input, which high voltage is then provided to an RC circuit formed by resistor 963 and capacitor 964 for drain voltage 981 (e.g., associated with a voltage supplied first to voltage line input 958 via first USB interface 202) or an RC circuit formed by resistor 960 and capacitor 961 for drain voltage 982 (e.g., associated with a voltage supplied first to voltage line input 953 via second USB interface 203).

The output of the active RC circuit is fed back to the input of the inverter, which causes the voltage at the input to the inverter to rise based on the RC constant. This eventually causes the input voltage to the active inverter to rise above a threshold (based on a voltage drop over respective resistor 965 or 966), which causes the inverter to output a low voltage. This in turn discharges the capacitor 964 or 961, causing a drop in the voltage at the active input of inverter 962, and thus repeating the cycle of the active portion of the inverter switching between a high and low voltage based on the RC constant of the RC circuit. In this manner, the oscillating signal is provided to one of the ID pins 970 or 949 of USB interface 202 or 203. The drain voltage 981 or 982 that is at the standard supply voltage will hold its associated inverter input to high, and output to ground, through resistor 965 or 966, such that the respective RC circuit does not charge, the inverter output does not change, and no oscillating signal is provided through the other of ID pins 970 or 949.

The outputs of the inverter 962 are provided to the respective ID pin via schottky diode 967 (e.g., to ID pin 970 associated with first USB interface 202) or schottky diode 951 (e.g., to ID pin 949 associated with second USB interface 203). The schottky diodes 967 and 951 may prevent other signals (e.g., an oscillating signal from a merchant terminal 112, or a programming signal provided to a merchant terminal 112) from being conducted to the voting and oscillator circuit 610.

As described herein, once the oscillating signal is provided to a USB hub 104, the USB hub 104 may provide the power supply voltage 502/801 to the voltage line of the USB interface 202 or 203 that provided the oscillating signal. As described herein, the power supply voltage may enable a latch 604 or 608, which in turn may cause power enable switch 612 or 616 to enable power supply switch 602 or 606, providing the power supply voltage to the merchant terminal power supply.

Although a latch 604 or 606 may include any suitable components to provide an enabling signal to a respective power enable switch 612 or 616, in an embodiment the latch 604 may comprise a voltage divider resistors 908 and 909 coupled to voltage line 901 and schottky diode 911 coupled to power enable switch 612. Latch 606 may comprise voltage divider resistors 939 and 940 coupled to voltage line 948 and schottky diode 937 coupled to power enable switch 616. When an appropriate voltage (e.g., the power supply voltage) is provided at a respective voltage pin 901 or 948, the associated voltage divider may have a value that exceeds a threshold necessary to enable the power enable switch 612 or 616 (e.g., via schottky diode 911 or 937). Because the input to the power enable circuit 612 and 616 is connected to the ID pin associated with that enable circuit (e.g., ID pin 970 or 949), schottky diodes 911 and 937 may prevent current from being provided to the latch circuit 604 or 606 by from the ID pin 970 or 949.

As described herein, after the power supply voltage is provided to the merchant terminal 110 (e.g., based on the operation of voting and oscillator circuit 610 in providing the oscillating signal, one of latch 604 or 606 providing an enabling signal to power enable switch 612 or 616, and one of power enabling switch 612 or 616 causing power supply switch 602 or 606 to conduct), the other "side" of the merchant terminal may be at a system voltage such as 5 volts. As depicted in FIG. 9, this system voltage 980 may be coupled to the voltage lines via fuse 903 and schottky diodes 904 and 941 (e.g., which may stop current from conducting to the system voltage when the power supply voltage is provided at the associated voltage line). As is further described herein with respect to FIGS. 7 and 10, when a customer terminal is connected to this system voltage, it may provide an oscillating signal to an ID pin, such as ID pin 970 or ID pin 949, which may be provided to a respective one of oscillator input 614 or oscillator input 618.

Although an oscillator input 614/618 may include any suitable components to convert an incoming oscillating signal into an appropriate DC voltage, in an embodiment the oscillator input may include capacitor 910/947, schottky diode 968/946, schottky diode 912/938, resistor 913/935, capacitor 914/936, and resistor 915/934. Resistors 917 and 932, though depicted in FIG. 9, may not be placed in an example embodiment. Collectively, the resistors 915/948 and 913/935, and capacitors 910/947 and 914/936 may provide an RC circuit having appropriate resistance and capacitance values (e.g., approximately 47 k ohms for resistor 813, approximately 470 k ohms for resistor 811, approximately 1 µF for capacitor 812, and approximately 1 nF for capacitor 817) to receive the oscillating signal at ID line 970/949 and provide a substantially DC signal to the gate of MOSFET 916/933. Schottky diode 912/938 may block current that passes through Schottky diode 911/937 from conducting to capacitor 910/947 and ID line 970/949. Similarly, Schottky diode 911/937 may block current that passes through Schottky diode 912/938 from conducting to resistors 908/940 and 909/939.

The action of the power enable switch 612/614 and the power supply switch 602/606 may selectively couple one or both of the voltage lines 901/948 to the merchant terminal supply voltage. Moreover, diodes 922 and 927 may also connect one of the voltage lines 901/948 to the merchant terminal supply voltage when the diode's associated the MOSFET 914/928 is not conducting and an appropriate voltage is provided at the voltage lines 901/948. Thus, the voltage of the merchant terminal supply voltage may function as an operating supply voltage that varies depending on the voltage supplied to the voltage lines 901/948 and the state of the power supply switches 602/606.

Although power enable switch 612/616 may include any suitable components to provide an enabling signal to the power supply switch 602/606 (e.g., a low-voltage enabling signal if MOSFET 914/928 is a p-channel MOSFET), in an embodiment the power enable switch 612/616 may include n-channel MOSFET 916 and resistor 919/930. In an example embodiment, n-channel MOSFET 918/931 may be provided in series between MOSFET 914/928 and resistor 919/930. MOSFET 918/931 may be coupled to a processor output or physical switch to provide programmable or human control the power supply switch 602/606. The gate of MOSFET 919/930 may be coupled to the outputs of both the latch 604/608 and the oscillator input 614/618, the source may be coupled to ground, and the drain may be coupled to resistor 919/930, and resistor 920/929, to the merchant terminal power supply voltage 923. When the substantially DC voltage from either of the latch 604/608 or the oscillator input 614/618 exceeds the threshold voltage of MOSFET 916/933, current may flow from the drain of MOSFET 916/933 to the source (e.g., to ground), creating a voltage divider at the gate of MOSFET 914/928 based on the voltage of the merchant terminal supply voltage 923 and the values of resistors 920/929 and 919/930.

Although power supply switch 602/606 may include any suitable components to selectively couple the voltage line 901/948 to the merchant terminal supply voltage 923, in an embodiment the power supply switch 602/606 may include resistor 920/929, diode 922/927, and p-channel MOSFET 914/928. The gate of MOSFET 914/928 may be coupled to the resistor 919/930 of power enable switch 612/616 and to resistor 920/929. The source of MOSFET 914/928 may be coupled to the other terminal of resistor 920/929 and merchant terminal supply voltage 923. The drain of MOSFET 919 may be coupled to the voltage line 901/948.

When MOSFET 916/933 is not conducting, the gate voltage of MOSFET 914/928 may essentially be held at the same voltage as the source, based on resistor 920/929. A voltage at one of the voltage lines 901 or 948 will be provided to the merchant terminal power supply 923 via one of diodes 922 or 927, while the other diode 922 or 927 will block current. When MOSFET 916/933 is conducting, the voltage at the gate of MOSFET 914/928 drops based on the voltage divider of resistors 920/929 and 919/930, causing the MOSFET 914/928 to conduct. In this manner, the power supply voltage from USB hub 104 is provided as the merchant terminal supply voltage 923 (e.g., based on the operation of latch 604 or 608) and is also provided to the customer terminal 112 (e.g., based on the operation of oscillator input 614 or 618).

Merchant terminal 110 may also include download switches 620/622 that cause a programming voltage to be provided to the ID pin of a customer terminal. Although download switch 620/622 may include any suitable components to provide the programming voltage, in an embodiment the download switch 620/622 may include n-channel MOSFET 907/944, resistor 906/943, resistor 905/942, and p-channel MOSFET 902/945. The gate of MOSFET 907/944 may be coupled to a processing unit, and in response to an enabling voltage (e.g., higher than the ground voltage coupled to the source by at least a threshold voltage), MOSFET 907/944 may conduct causing a voltage divider of resistor 906/943 and resistor 905/942 to provide a reduced voltage from the voltage line 901/948 to a gate of MOSFET 902/945. This reduced voltage may be less than a source voltage by at least a threshold voltage, based on the source of MOSFET 902/945 being connected to the voltage line 901/948. MOSFET 902/945 may begin to conduct, providing the voltage at the voltage line 901/948 (e.g., the programming voltage) to the ID line 970/949.

Figure 10:
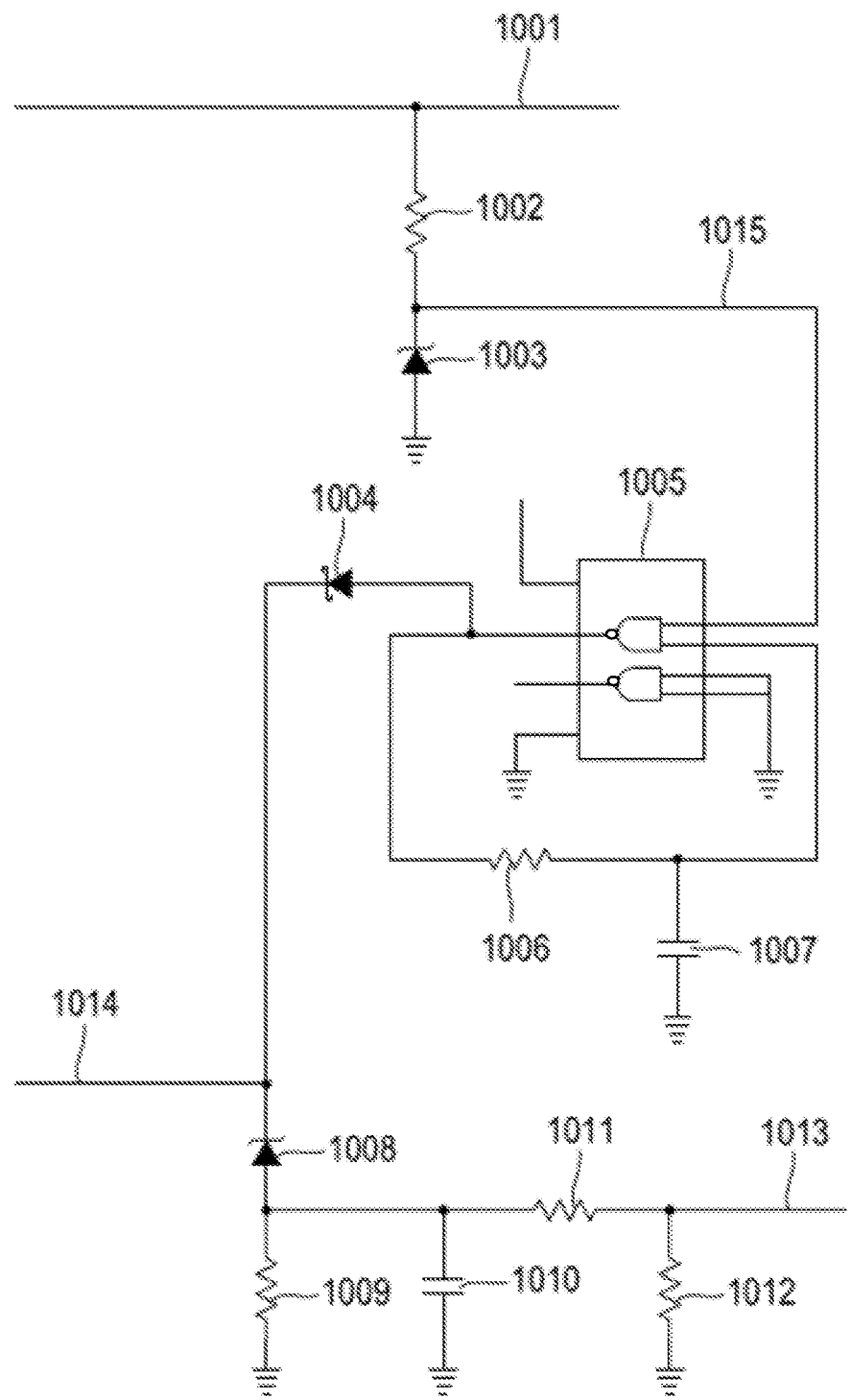
FIG. 10 depicts an exemplary schematic diagram of certain components of a customer terminal in accordance with some embodiments of the present disclosure.

FIG. 10 depicts an example schematic diagram of certain components of a customer terminal in accordance with some embodiments of the present disclosure. In an embodiment, groupings of the discrete components depicted in FIG. 10 may correspond to the oscillator circuit 702 and download circuit 704. Although particular discrete components are depicted as corresponding to particular portions of FIG. 7 in the embodiment depicted in FIG. 10, it will be understood that each of the portions of FIG. 10 may be implemented in a variety of manners. In an embodiment, voltage line 1001 may correspond to the voltage line of USB interface 302 and ID line 1014 may correspond to the ID line of USB interface 302.

As described herein, when a customer terminal 112 is initially coupled to a merchant terminal 110 via a USB cable, a system voltage 980 (e.g., approximately 5 volts) is provided to the voltage line 1001 of USB interface 302. As described herein, this system voltage 980 is provided to the oscillator circuit 702. Although the oscillator circuit 702 may include any suitable components to provide an oscillating signal to ID line 1014, in an embodiment the oscillator circuit 702 may include NAND gate 1005, resistors 1002 and 1006, capacitor 1007, zener diode 1003, and schottky diode 1004. Although a NAND gate 1005 is depicted in FIG. 10, it will be understood that the oscillator may utilize other components such as an inverter (e.g., as depicted in FIG. 9). Similarly, other implementations (e.g., of FIG. 9) may utilize a NAND gate, as described herein for FIG. 10.

A voltage at voltage line 1001 (as limited by a zener voltage of zener diode 1003) may be provided to the NAND gate 1005 input 1015 via resistor 1002. When the voltage at input 1015 changes to exceed a threshold, the output of the NAND gate 1005 may change. For example, when the system voltage 980 is provided to voltage line 1001, the NAND gate 1005 may have initially been outputting a "1" or high voltage because of a low voltage at input 1015. The other input to the NAND gate 1005 would have the high voltage as an input based on the feedback from the output of the NAND gate 1005. Once the input 1015 goes high, the output of the NAND gate 1005 will switch to a "0" or low voltage. The other input to the NAND gate 1005 will go low over time, based on the RC constant of resistor 1006 and capacitor 1007. Once the other input drops below a threshold for the NAND gate 1005, the output of the NAND gate 1005 will again switch to high, and the voltage of the other input will raise again based on the RC constant of resistor 1006 and capacitor 1007. The periodic output of the NAND gate 1005 will have a frequency based on the RC constant and may be provided to the ID line 1014 via schottky diode 1004 as the oscillating signal that is provided to the merchant terminal 110. Schottky diode 1004 may block any current from conducting from the programming signal provided on the ID line 1014.

As described herein, a programming voltage may be provided to a download circuit 704 of the customer terminal 112 via the ID line of the USB interface 302 (e.g., ID line 1014). Although the download circuit 704 may include any suitable components for processing the received processing signal, in an embodiment the download circuit may include zener diode 1008, resistors 1009, 1011, and 1012, capacitor 1010, and download output 1013. Zener diode 1008 may limit the voltage at ID line 1014 based on a zener voltage of the zener diode 1008. Resistors 1009 and capacitor 1010 may provide filtering of any incoming signal, and resistors 1011 and 1012 may provide a voltage divider to download output 1013. In an embodiment, download output 1013 may be provided to a processing unit for processing, e.g., to invoke a software download when a programming voltage is provided to the ID line 1014 from a merchant terminal 110.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for providing multiple functionalities over a single pin of a USB interface, comprising:
    a merchant terminal, comprising:
        a merchant terminal USB interface comprising a merchant terminal voltage pin, a merchant terminal ground pin, a plurality of merchant terminal data pins, and a merchant terminal ID pin;
        a merchant terminal power supply, wherein the merchant terminal power supply provides a merchant terminal supply voltage to a plurality of components of the merchant terminal;
        a merchant terminal power supply switch coupled to the merchant terminal voltage pin and the merchant terminal power supply, wherein the merchant terminal power supply switch is configured to couple the merchant terminal voltage pin to the merchant terminal power supply when an enabling signal is received at a merchant terminal power supply switch input;
        a merchant terminal oscillator input circuit coupled to the merchant terminal ID pin, wherein the merchant terminal oscillator input circuit is configured to cause the enabling signal to be provided to the merchant terminal power supply switch input when an oscillating signal is received at the merchant terminal ID pin; and
        a download switch coupled to the merchant terminal ID pin, wherein the download switch is configured to selectively provide a programming voltage to the merchant terminal ID pin, and wherein the programming voltage is based on the merchant terminal supply voltage; and
    a customer terminal, comprising:
        a customer terminal USB interface comprising a customer terminal voltage pin, a customer terminal ground pin, a plurality of customer terminal data pins, and a customer terminal ID pin;
        a customer terminal oscillator coupled to the customer terminal ID pin, wherein the customer terminal oscillator is configured to output the oscillating signal to the customer terminal ID pin; and
        a programming interface coupled to the customer terminal ID pin, wherein the programming interface initiates a programming mode of the customer terminal when the programming voltage is received at the customer terminal ID pin.

2. The system of claim 1, wherein the merchant terminal further comprises a merchant terminal oscillator coupled to the merchant terminal ID pin, wherein the merchant terminal oscillator is configured to provide an output oscillating signal to the merchant terminal ID pin when a standard supply voltage is received at the merchant terminal voltage pin.

3. The system of claim 1, wherein the merchant terminal oscillator input circuit is configured to convert the oscillating signal into a substantially direct current signal and to substantially block a direct current signal.

4. The system of claim 1, further comprising a latch circuit coupled to the merchant terminal voltage pin, wherein the latch circuit is configured to couple the merchant terminal voltage pin to the merchant terminal power supply when a hub power supply voltage is received at the merchant terminal voltage pin.

5. A system, comprising:
    an interface comprising a voltage pin and an ID pin;
    a power supply, wherein the power supply provides an operating supply voltage to a plurality of components;
    a power supply switch coupled to the voltage pin and the power supply, wherein the power supply switch is configured to couple the voltage pin to the power supply when an enabling signal is received at a power supply switch input;
    an oscillator input circuit coupled to the ID pin, wherein the oscillator input circuit is configured to cause the enabling signal to be provided to the power supply switch input when an oscillating signal is received at the ID pin; and
    a download switch coupled to the ID pin, wherein the download switch is configured to selectively provide a programming voltage to the ID pin, and wherein the programming voltage is based on the operating supply voltage.

6. The system of claim 5, further comprising an oscillator coupled to the ID pin, wherein the oscillator is configured to provide an output oscillating signal to the ID pin when a standard supply voltage is received at the voltage pin.

7. The system of claim 6, wherein the operating supply voltage is at least twice as large as the standard supply voltage.

8. The system of claim 7, wherein the operating supply voltage is approximately twelve volts and the standard supply voltage is approximately five volts.

9. The system of claim 5, wherein the oscillator input circuit is configured to convert the oscillating signal into a substantially direct current signal.

10. The system of claim 9, wherein the oscillator input circuit is further configured to substantially block a direct current signal.

11. The system of claim 5, further comprising a latch circuit coupled to the voltage pin, wherein the latch circuit is configured to couple the voltage pin to the power supply when a hub power supply voltage is received at the voltage pin.

12. The system of claim 5, wherein the interface comprises a USB interface.

13. The system of claim 12, wherein the USB interface further comprises a ground pin and two data pins.

14. The system of claim 5, wherein the download switch is configured to connect the ID pin to the voltage pin to provide the programming voltage to the ID pin.

15. The system of claim 5, further comprising:
    a logical input coupled to the download switch, wherein the download switch provides the programming voltage when a download voltage is provided to the logical input; and a processing unit coupled to the logical input, wherein the processing unit is configured to provide the download voltage to the logical input.

16. The system of claim 15, wherein the processing unit is configured to provide the download voltage to the logical input in response to a request to program a device.

17. The system of claim 15, further comprising a plurality of data pins, wherein a program download is transmitted over the plurality of data pins based on the programming voltage being provided to the ID pin.

18. A method, comprising:
providing, from a power supply, an operating supply voltage to a plurality of components;
coupling, by a power supply switch, a voltage pin to the power supply when an enabling signal is received at a power supply switch input;
receiving, at an oscillator input circuit, a first ID signal from an ID pin;
providing, to the power supply switch input, the enabling signal when the first ID signal comprises an oscillating signal;
providing, to a download switch, a first voltage;
providing, by the download switch, a programming voltage to the ID pin when the first voltage comprises a download voltage.

19. The method of claim 18, further comprising:
receiving a standard supply voltage at the voltage pin; and
providing, from an oscillator, an output oscillating signal to the ID pin when the standard supply voltage is received at the voltage pin.

20. The method of claim 19, wherein the operating supply voltage is at least twice as large as the standard supply voltage.

21. The method of claim 20, wherein the operating supply voltage is approximately twelve volts and the standard supply voltage is approximately five volts.

22. The method of claim 18, further comprising converting, by the oscillator input circuit, the oscillating signal into a substantially direct current signal.

23. The method of claim 22, further comprising blocking, by the oscillator input circuit, a direct current signal.

24. The method of claim 18, further comprising coupling, by a latch, the voltage pin to the power supply when a hub power supply voltage is received at the voltage pin.

25. The method of claim 18, wherein the ID pin comprises an ID pin of a USB interface.

26. The method of claim 25, wherein the voltage pin comprises a voltage pin of the USB interface.

27. The method of claim 18, wherein providing, by the download switch, a programming voltage to the ID pin when the first voltage comprises a download voltage comprises connecting the ID pin to the voltage pin to provide the programming voltage to the ID pin.

28. The method of claim 18, further comprising providing, from a processing unit, the first voltage.

29. The method of claim 28, further comprising:
receiving, at the processing unit, a request to program a device; and
providing the download voltage as the first voltage based on the request to program.

30. The method of claim 29, further comprising:
providing, from the processing unit, the program to a plurality of data pins; and
transmitting the program to the device via the plurality of data pins.

* * * * *